United States Patent [19]
Marchant

[11] Patent Number: 4,899,159
[45] Date of Patent: Feb. 6, 1990

[54] METHOD AND DEVICE FOR A M-OUT-OF-N DETECTION SCHEME

[75] Inventor: Jeffrey D. Marchant, Tempe, Ariz.

[73] Assignee: Motorola, Inc., Schaumburg, Ill.

[21] Appl. No.: 226,910

[22] Filed: Aug. 1, 1988

[51] Int. Cl.[4] .......................... G01S 7/30; G01S 13/04
[52] U.S. Cl. ......................................... 342/90; 342/195
[58] Field of Search ................. 342/90, 195, 197, 159; 364/517

[56] References Cited

U.S. PATENT DOCUMENTS

| | | | |
|---|---|---|---|
| 3,386,091 | 5/1968 | Wilmont et al. | 342/90 |
| 3,500,396 | 3/1970 | Lampert et al. | 342/90 |
| 4,214,239 | 7/1980 | Dillard | 342/90 |

Primary Examiner—Thomas H. Tarcza
Assistant Examiner—Gilbarto Barrón, Jr.
Attorney, Agent, or Firm—Jordan C. Powell; Maurice J. Jones

[57] ABSTRACT

A M-out-of-N target detections scheme wherein a target detection is extended in range of both sides by an amount equal to the distance the target would travel at its highest expected speed during the N intervals. The M-out-of-N determination is then made with a target declaration being produced upon the amount of N determination being met and that the most recent integration period contains a target detection in the range gate of interest.

5 Claims, 1 Drawing Sheet

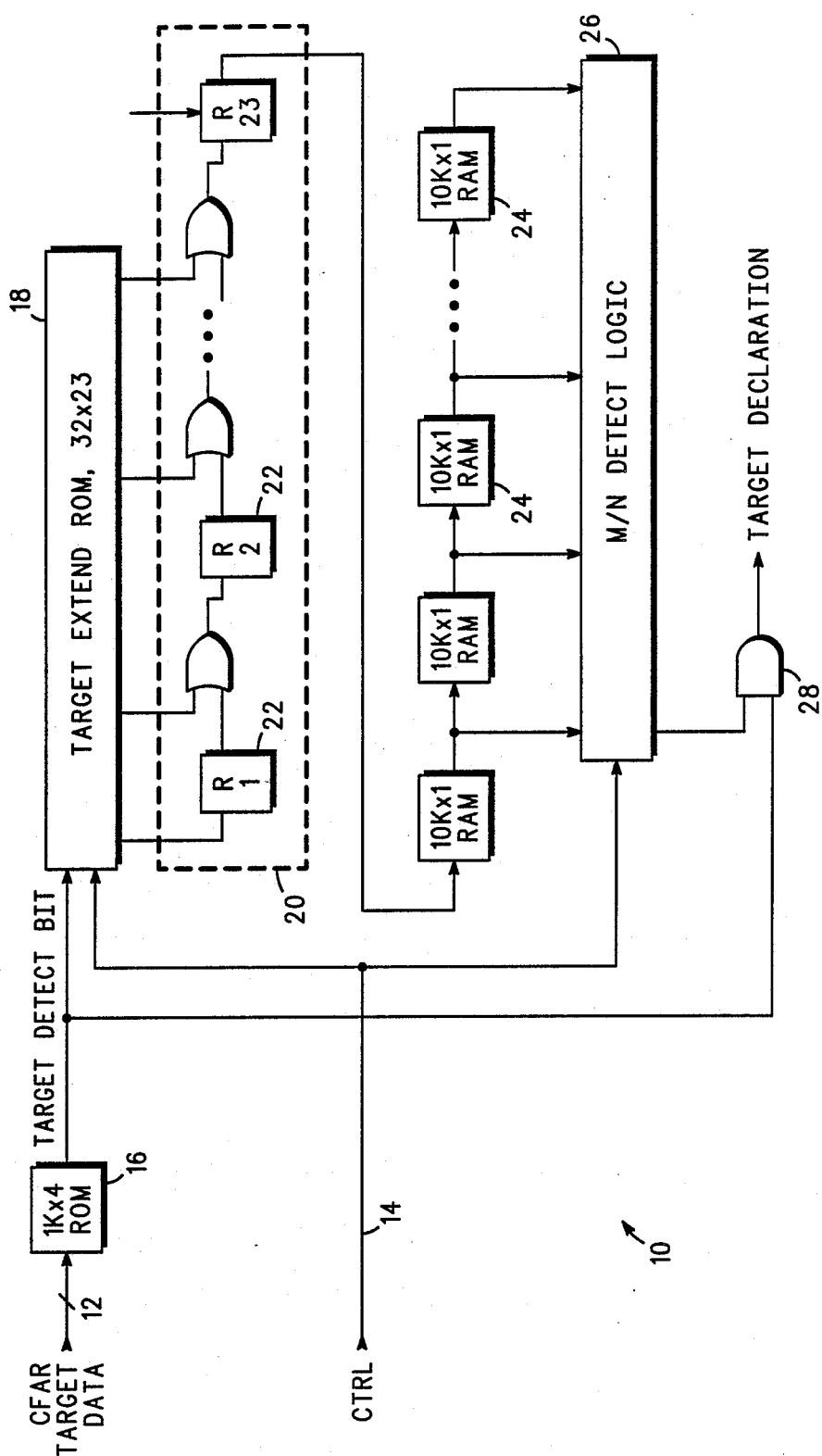

METHOD AND DEVICE FOR A M-OUT-OF-N DETECTION SCHEME

BACKGROUND OF THE INVENTION

The present invention pertains to a method and device for a M-out-of-N detection scheme.

In radar systems, a low false alarm rate is desired without a corresponding decrease in target sensitivity. To achieve this result, the M-out-of-N detection scheme has been developed. In the prior art, the M-out-of-N detection scheme reduces the false alarms by requiring M target detections across an azimuth section N integration periods wide. It is assumed that the target does not move to a different range gate during the N integration periods. This is a misleading assumption and may result in a real target not being detected since M target detections out of N integration periods have not been met.

More complex M-out-of-N schemes involve analyzing reasonable target paths through a range-azimuth matrix, and give the best possible target sensitivity for the range of expected target velocities. This provides for a target moving between range gates, however, they either require a large amount of hardware or do not work in real time, and do not increase target sensitivity in multiple target situations.

SUMMARY OF THE INVENTION

The present invention is a M-out-of-N scheme for reducing the false alarm rates of radar systems while increasing the systems target detection sensitivity. Target extension means stretches a target in both range directions by an amount equal to the distance the target would travel at its highest expected radial speed during the N intervals. The range gate information for each integration period is stored in a separate integration period memory. The M-out-of-N determination is then made in a M-out-of-N logic means, and is programmable as a function of range. The false alarm rate is further reduced by requiring that the most recent interval contains a target detection in the range gate of interest before stretching.

It is an object of the present invention to provide a new and improved target detections scheme.

It is a further object of the present invention to provide a M-out-of-N target detections scheme which increases the target detection sensitivity of a radar system while decreasing the false alarm rate of the radar system.

It is another object of the present invention to provide a M-out-of-N target detections scheme having a target detection sensitivity which does not decrease with target radial speed.

It is a further object of the present invention to provide a M-out-of-N target detections scheme which has an increased target detection sensitivity in multiple target situations.

These and other objects of the present invention will become apparent to those skilled in the art upon consideration of the accompanying specification, claims and drawing.

BRIEF DESCRIPTION OF THE DRAWING

The FIGURE is a block diagram of a M-out-of-N device embodying the present invention.

DESCRIPTION OF THE PREFERRED EMBODIMENT

Referring to the FIGURE, a M-out-of-N target detection device generally designated 10 is illustrated in block diagram. Target detection data from a radar system, and specifically from Constant False Alarm Rate (CFAR) devices or the like, enter M-out-of-N device 10 via a data bus 12. A control word specifying the range of each range gate is inputted into M-out-of-N device 10 via a control bus 14. A target decode means 16 has an input coupled to data bus 12 and an output. Target decode means 16, in this embodiment, is a ROM which acts as a look-up table, and outputs a target detect bit for each range gate having a target detected therein. In this embodiment, the target detect bit is a 1 while if no target is detected a 0 is produced. A target extension means, which in this embodiment comprises a target extension ROM 18 having a first input coupled to the output of target decode means 16, a second input coupled to control bus 14, and a plurality of outputs coupling said target extension ROM 18 to an oring register 20, extends a target into adjacent range gates. Oring register 20 has a plurality of holding registers 22, the number depending upon the maximum target extension desired. The contents of holding registers 22 are ored with data from target extension ROM 18 with the result being inputted into the succeeding register. A plurality of integration period memories 24, which in this embodiment are RAMs, the number of which are dependent upon the maximum N or integration periods of the M-out-of-N determination, are coupled in series, the first in the series having an input coupled to the output of oring register 20 and each memory of which has an output coupled to a M-out-of-N logic means 26. M-out-of-N logic means 26 has an input coupled to said control bus 14, and an output. An AND gate 28 has a first input coupled to said output of M-out-of-N logic means 26, a second input coupled to said output of target decode means 16, and an output.

Target data from a radar system enters M-out-of-N device 10 via data bus 12. During each integration period, range gate data is inputted into target decode means 16. In this embodiment, target decode means 16 is a ROM which acts as a look-up table, and which outputs a target detect bit, for each range gate having a target detected therein of an integration period. If a target detection has not occurred in a range gate, then a 0 is produced. As a target detect bit, corresponding to a range gate having a target detected therein, enters target extension ROM 18, a control word specifying the range of the range gate enters target extension ROM 18 via control bus 14. Target extension ROM 18 in this embodiment, is controlled by a 4-bit control word from control bus 14. This control word determines how many range gates, depending on range, the target of interest will be extended on a side. In this specific embodiment, a target can be extended a maximum of 11 range gates on each side. A target is extended every time a target detect bit for a range gate of interest enters target extension ROM 18. Target detect bits are then placed in range gates to either side of the range gate of interest dependent upon the control word from control bus 14, thus extending the target. The range gates are inputted into oring register 20. In this embodiment, there are 23 registers, so 23 target detect bits can be put into registers 22 at one time. This means the target can be extended a maximum of 11 range gates on a side.

These range gates are then shifted sequentially and stored in the first of integration period memories 24. Also, in this embodiment, there are 23 serially loaded memories 24 coupled in series each storing the target detect bits for an integration period. The first memory in the series stores a bit corresponding to each range gate of that integration period. Thus, it stores the target detect bit of the range gate in which a target was detected, and target detect bits in adjacent spots corresponding to range gates adjacent the range gate of interest. As the next integration period occurs, the contents of this memory are removed to the next memory in this sequence and inserted into M-out-of-N detection means 26. When enough target detections M are entered into M-out-of-N detection means 26 during N integration periods, a target is declared. The control word from control bus 14 also enters M-out-of-N detection means 26 and specifies which M-out-of-N determination is used. In this embodiment, N can be a maximum of 23 integration periods. When the M-out-of-N determination has been met, that is when M-out-of-N detections have occurred in the M-out-of-N detection means 26, a signal is output to AND gate 28. At this time, the target detect bit for the current integration period of the range gate of interest, also enters AND gate 28. Thus, a target is declared in a range gate by the M-out-of-N hardware only when a target detect bit has been produced by the target decode means 16 before stretching, and simultaneously meets a M-out-of-N detection criteria after stretching in the N integration periods just previous. This leaves the target detection probability unaffected while false alarm probability is reduced. This also fixes the location of the target in a specific range gate.

There is thus provided by the present invention a substantially improved M-out-of-N detection scheme. Due to the extension of the range gate of interest, radial movement of the target does not affect target detection probability. Further, the extension of the range gates can be accomplished in a small amount of hardware, thus reducing price and complexity. Also, since a small amount of hardware is used and complexity has been avoided, a real time solution has been found.

Having thus described the invention, it will be apparent to those of ordinary skill in the art that various modifications can be made within the spirit and scope of the invention. For example, while target data with regards to amplitude was not used in this embodiment, it would be possible to employ this data using conventional means. Also, it is possible that the target may appear in a blind speed of one of the pulse repetition frequencies of the radar system using the M-out-of-N device 10, and thus can be detected only in half of the N intervals. This can be automatically detected by the hardware lookup PROMS, and a special M-out-of-N criteria may be utilized. For example, at a range gate where the 8 out of 23 criteria is normally used, if the target is in a blind speed of 1 pulse repetition frequency but not the other, this requires that the target be detected in 8 intervals of only 12 possibilities, which reduces target sensitivity. However, this loss in sensitivity is reduced by requiring only 7 detections whenever a target is detected in only 1 pulse repetition frequency. Further, any amount of the M-out-of-N criteria could be changed depending upon the expected target speed.

What I claim is:

1. An M-out-of-N target detections device comprising:
   a target data bus;
   a target decode means having an input coupled to said target data bus and an output;
   a control bus;
   a target extension means having a first input coupled to said output of said target decode means, a second input coupled to said control bus and an output;
   a plurality of serially loaded memories;
   a first of said serially loaded memories having an input coupled to said output of said target extension means;
   each of said plurality of serially loaded memories having an output coupled to a M-out-of-N logic means;
   said M-out-of-N logic means having an input coupled to said control bus and an output; and
   an AND gate having a first input coupled to said M-out-of-N logic means, a second input coupled to said output of said target decode means and an output.

2. A device as claimed in claim 1 wherein said target extension means further comprises:
   a target extension memory having a first input coupled to said target decode means, a second input coupled to said control bus and a plurality of outputs coupled to an oring register.

3. A M-out-of-N detections method comprising the steps of:
   providing target detections for each of a plurality of integration periods;
   extending said target detections in both range directions;
   storing extended target detections for each integration period;
   analyzing each of said extended targets in said integration periods using a M-out-of-N determination; and
   outputting a target declaration if said M-out-of-N determination has been met.

4. A M-out-of-N detections method comprising the steps of:
   providing target detections for each of a plurality of integration periods;
   extending said target detections in both range directions;
   storing extended target detections for each integration period;
   analyzing each of said extended targets in said integration periods using a M-out-of-N determination;
   detecting a target in said most recent integration period; and
   outputting a target declaration if said M-out-of-N determination and said detecting a target in said most recent integration period have been met.

5. A M-out-of-N detections method comprising the steps of:
   providing target detections for each of a plurality of integration periods;
   extending a target a number of range gates on both sides as a function of range;
   storing extended target detections for each integration period;
   analyzing each of said extended targets in said integration periods using a M-out-of-N determination; and
   outputting a target declaration if said M-out-of-N determination has been met.

* * * * *